(12) United States Patent
Gros et al.

(10) Patent No.: US 11,974,353 B2
(45) Date of Patent: Apr. 30, 2024

(54) SYSTEM FOR CONNECTING A TELECOMMUNICATION TERMINAL TO A NATIONAL NETWORK AND CORRESPONDING SECURE ELEMENT AND TERMINAL

(71) Applicant: THALES DIS FRANCE SAS, Meudon (FR)

(72) Inventors: Jean-François Gros, La Ciotat (FR); Ly Thanh Phan, La Ciotat (FR); Vincent Dany, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 333 days.

(21) Appl. No.: 17/439,420

(22) PCT Filed: Mar. 17, 2020

(86) PCT No.: PCT/EP2020/057171
§ 371 (c)(1),
(2) Date: Sep. 15, 2021

(87) PCT Pub. No.: WO2020/187866
PCT Pub. Date: Sep. 24, 2020

(65) Prior Publication Data
US 2022/0191677 A1 Jun. 16, 2022

(30) Foreign Application Priority Data
Mar. 18, 2019 (EP) ..................... 19305327

(51) Int. Cl.
*H04W 8/08* (2009.01)
*H04W 84/04* (2009.01)

(52) U.S. Cl.
CPC ............ *H04W 8/08* (2013.01); *H04W 84/042* (2013.01)

(58) Field of Classification Search
CPC ..... H04W 8/08; H04W 84/042; H04W 60/00; H04W 88/06; H04W 48/18; H04W 8/183
See application file for complete search history.

(56) References Cited

U.S. PATENT DOCUMENTS

| 11,323,922 | B2 * | 5/2022 | Zetterlund | ............ H04W 36/26 |
| 2019/0037484 | A1 | 1/2019 | Davis et al. | |

FOREIGN PATENT DOCUMENTS

EP 1513358 A1 3/2005

OTHER PUBLICATIONS

International Search Report (PCT/ISA/210) and Written Opinion (PCT/ISA/237) dated Apr. 29, 2020, by the European Patent Office as the International Searching Authority for International Application No. PCT/EP2020/057171 (WO2020/187866)—[13 pages].

* cited by examiner

Primary Examiner — Kabir A Timory

(57) ABSTRACT

A system comprising a secure element cooperating with a telecommunication terminal is provided. The secure element or the terminal comprises files in which MCC/MNC codes of MNOs are stored. The telecommunication terminal is configured to select the files in order to attach the terminal to the telecommunication network of a MNO. The secure element or the terminal also comprise a file, called National like network file, for storing national network codes (MCC/MNC) of networks of the country of the Home PLMN of the secure element. The terminal selects the National like network file in order to try to connect the terminal to one of the networks referenced in the National like network file. Other embodiments are disclosed.

11 Claims, 1 Drawing Sheet

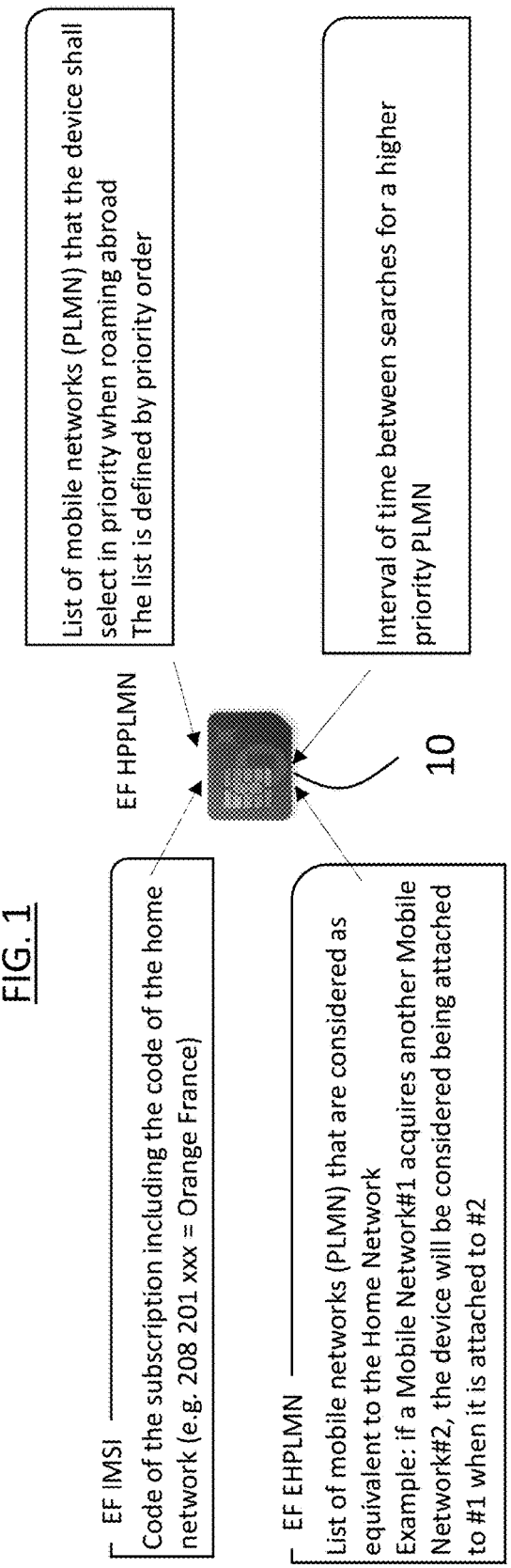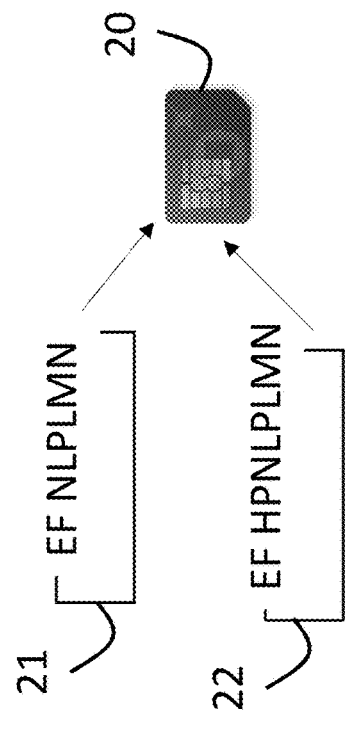

SYSTEM FOR CONNECTING A TELECOMMUNICATION TERMINAL TO A NATIONAL NETWORK AND CORRESPONDING SECURE ELEMENT AND TERMINAL

BACKGROUND

Field

The invention concerns telecommunications, and more precisely, a system permitting to lower the cost for a MNO (Mobile Network Operator) when one of its subscribers is in a situation of national roaming. Specifically, a secure element, such as a USIM is contemplated, and more generally, other xUICC (Universal Integrated Circuit Card) products (embedded or not), like e-UICCs (embedded UICCs) or i-UICCs (integrated UICCs).

Introduction xUICCs embed USIMs (Universal Sim applications) and cooperate with telecommunication terminals in order to communicate in a 2G, 3G, 4G or 5G network. The telecommunication terminals are typically handsets, mobile phones, smartphones, PDAs M2M mobile devices or IoT mobile devices. Each secure element or each terminal comprises a plurality of files and especially files in which MCC/MNC (Mobile Country Code/Mobile Network Code) codes of MNOs are stored. These codes define a PLMN. A PLMN is a Public Land Mobile Network, each MNO providing mobile services having its own PLMN.

Different types of PLMNs exist, among them:
HPLMN: Home PLMN
  Derived from IMSI IMSI(not more than 15 digits)=PLMN
     ID+MSIN=MCC+MNC+MSIN EHPLMN: Equivalent PLMN
  Stored in USIM EF_EHPLMN
  Regarded by the UE (User Equipment=terminal+secure element) as equivalent to each other for PLMN selection, the UE shall update or delete this list at the end of each attach or combined attach or tracking area updating or combined tracking area updating procedure. When the UE is switched off, it shall keep the stored list so that it can be used for PLMN selection after switch on, where:
UPLMN: User Controlled PLMN
  Stored in USIM in EF_PLMNwACT
OPLMN: Operator Controlled PLMN
  Stored in USIM in EFOPLMNwACT
VPLMN: Visitor PLMN
  Given by Physical Layer Search.
FPLMN: Forbidden PLMN
  Stored in USIM in EF_FPLMN The terminal has two PLMN Selection modes, as described for example in 3GPP TS 23.122 V8.2.0:
  Automatic PLMN Selection
  Manual PLMN Selection For the automatic PLMN Selection Mode:
  Either the HPLMN (if the EHPLMN (in USIM) list is not present or is empty) or the highest priority EHPLMN that is available (if the EHPLMN list is present).
  Each PLMN/Access Technology combination in the "User Controlled PLMN Selector with Access Technology" (UPLMNwACT) data file in the USIM (in Priority Order).
  Each PLMN/Access Technology combination in the "Operator Controlled PLMN Selector with Access Technology" (OPLMNwACT) data file in the USIM (in Priority Order).
  Other PLMN/Access Technology combinations with received high quality signal received in the random order.
  Other PLMN/Access Technology combinations in order of decreasing signal quality.

The exceptions are:
  If the UE is in Automatic Network selection mode and if finds coverage of an EHPLMN, the UE may register to the highest priority EHPLMN available and not return to the registered PLMN or equivalent PLMN.
  If the EHPLMN list is not present or is empty, and the HPLMN is available, the UE may register on the HPLMN and not return to the registered PLMN or equivalent PLMN.
  The Operator shall be able to control by USIM configuration whether an UE that supports this option is permitted to perform this alternate behavior.

FIG. 1 shows four files stored in a secure element 10:
  An IMSI file EF IMSI (EF meaning Elementary File) storing the IMSI of the subscription. Here the MNO is for example Orange France (MCC=208 for France and MNC=201 for Orange, xxx being the MSIN);
  An EHPLMN file EF EHPLMN storing a list of PLMNs that are considered as equivalent to the Home Network;
  An OPLMNwAcT/PLMNwAcT file storing a list of PLMNs that the terminal shall select in priority when roaming abroad, this list being defined by priority order; and
  A HPPLMN file defining the interval of time between searches by the terminal for a higher priority PLMN.

This configuration is valid for a 3G network ongoing (4G, 5G).

SUMMARY

At least one problem is the following: In the secure element (or in the terminal) there are these dedicated files in order to ensure that the terminal connects to the preferred Mobile Network when the user travels abroad (roaming situation). Those files are called "OPLMN" (Operator Public Land Mobile Network) and "PLMN" (User controlled PLMN). When in roaming situation (connected to a mobile network outside the home country), the terminal periodically checks if the home network (to which the subscription belongs to, as defined in the file called "IMSI") is available. If it is available the terminal will automatically reconnect to its home network to avoid unnecessary roaming costs. The interval of time between each check is defined in HPPLMN.

In case the home network does not cover the whole country, it is necessary for the mobile operator to build partnership with other mobile network operators and have a "national roaming" if legally authorized by country regulations. In this case there is the file called EHPLMN (Equivalent PLMN) that lists the mobile operators that are equivalent to the home network (in case for example one mobile operator acquires another one, both are considered as "equivalent" from terminal selection perspective). Once the terminal attaches to a mobile operator part of the EHPLMN, the handset stays connected to it until it is no longer available.

The problem is that if ever a mobile network operator has to build "national" roaming agreements, then they have two solutions:

Put the national roaming partner in the OPLMN file. But in this case the terminal will consider it is roaming internationally and will then display the roaming logo on the screen of the terminal and switch off the data if the user has disabled data in roaming situation (like users generally do to avoid bill shocks). The user experience is bad and the user usually then calls the MNO call center. This represents a cost for the MNO (manpower for answering the calls) and leads to a bad user experience.

Put the national roaming partner in the EHPLMN file. But in that case the terminal will stay connected to the national roaming partner which is not cost effective for the Home MNO.

Embodiments of the invention solve this problem. They enable the mobile operator to provide continuity of mobile services to its users by allowing its users to transparently roam to partner operators in its home country, and to ensure the terminal re-attaches to the home network as soon as it is available. This avoids unnecessary roaming cost and delivers a seamless user experience.

In a first embodiment a system comprising a secure element cooperating with a telecommunication terminal is provided. The secure element, or the terminal, comprises files in which MCC/MNC codes of MNOs are stored. The telecommunication terminal being configured to select the files in order to try to attach the terminal to the telecommunication network of a MNO. The secure element or the terminal also comprises a file, called National like network file, that stores national network codes (MCC/MNC) of networks of the country of the Home PLMN of the secure element. The terminal selects the National like network file in order to try to connect the terminal to one of the networks referenced in the National like network file. The terminal being configured to regularly check whether Home PLMN or a PLMN present in the EHPLMN file is available. And, if the EHPLMN file exists, it does so in order to connect the terminal to the Home PLMN or to the PLMN of the EHPLMN file.

Preferably, the terminal is configured to not display a roaming logo on the screen of the terminal when the terminal is connected to one of the networks referenced in the National like network file. Advantageously, the terminal is configured to display on the screen of the terminal the name of the Home PLMN when the terminal is connected to one of the networks referenced in the National like network file. Preferably, the terminal is configured to enable data service when the terminal is connected to one of the networks referenced in the National like network file.

The terminal is advantageously configured to select successively the following files if the files exist in the secure element or in the terminal:
the EHPLMN file;
the National like network file; and
the file containing PLMNs of foreign countries.

In a second embodiment, a secure element is provided comprising files in which MCC/MNC codes of MNOs are stored. The secure element cooperates with a telecommunication terminal, the secure element also comprising a file, called National like network file, storing national network codes (MCC/MNC) of networks of the country of the Home PLMN of the secure element. The terminal being configured to select the National like network file in order to try to connect the terminal to one of the networks referenced in the National like network file. The terminal being configured to regularly check whether Home PLMN or a PLMN present in the EHPLMN file is available. And, if the EHPLMN file exists, it does so in order to connect the terminal to the Home PLMN or to the PLMN of the EHPLMN file.

In a third embodiment a telecommunication terminal cooperates with a secure element. The terminal or the secure element comprises files in which MCC/MNC codes of MNOs are stored. The telecommunication terminal being configured to select the files in order to try to attach the terminal to the telecommunication network of a MNO. The secure element or the terminal also comprises a file, called National like network file, for storing national network codes of networks of the country of the Home PLMN of the secure element. The terminal selects the National like network file in order to try to connect the telecommunication terminal to one of the networks referenced in the National like network file. The terminal being configured to regularly check whether Home PLMN or a PLMN present in the EHPLMN file is available. And if the EHPLMN file exists, it does so in order to connect the terminal to the Home PLMN or to the PLMN of the EHPLMN file.

The terminal is preferably configured to not display a roaming logo on the screen of the terminal when the terminal is connected to one of the networks referenced in the National like network file. Advantageously, the terminal is configured to display on the screen of the terminal the name of the Home PLMN when the terminal is connected to one of the networks referenced in the National like network file. Preferably, the terminal is configured to enable data service when the terminal is connected to one of the networks referenced in the National like network file. Advantageously, the terminal is configured to select successively the following files if the files exist in the secure element or in the terminal:
the EHPLMN file;
the National like network file;
the file containing PLMNs of foreign countries.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1 illustrates a secure element for storing files; and

FIG. 2 illustrates a secure element comprising two files configured for national roaming.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

A list of acronyms referenced herein is provided:

Acronyms

EF—Elementary File
EHPLMN—Equivalent PLMN
HPLMN—Home PLMN
HPNLPLMN—High Priority National Like PLMN
MCC—Mobile Country Code
MNC—Mobile Network Code MNO—Mobile Network Operator
NLPLMN—National Like PLMN
OPLMN—Operator Public Land Mobile Network
PLMN—Public Land Mobile Network FIG. 2 represents a secure element 20 comprising two new files used for national roaming purposes. These files are called NLPLMN 21 and HPNLPLMN 22.

The invention consists in adding to the existing files, a new file called NLPLMN 21 (for National Like PLMN) and HPNLPLMN 22 (for High Priority National Like PLMN) in the secure element 20 (or in the terminal cooperating with this secure element 20. The NLPLMN file 21 comprises a list of mobile networks which will be considered as national partner (they may not be necessarily from the home country to illustrate for example Europe where users can travel abroad with no roaming costs). The list is set in priority order.

The NLPLMN file 21 comprises optionally associated access technology. The PLMNs in this list have typically the same country code as the home PLMN (HPLMN). However, for near border use cases, the country code of these PLMNs could be different. The HPNLPLMN file 22 comprises the interval of time between searches for network re-selection when the terminal is attached to a National like network (a network comprised in the NLPLMN file). These two files are preferably stored in the secure element's 20 file system.

Herein contemplated is also a method for the selection of a network. It can, for example, comprise the following (the network selection process is changed regarding the state of the art):

At attachment, the terminal selects in order:
1. The Home network (present in the EF IMSI file);
2. An Equivalent network (present in the EF EHPLMN file), this list being set in priority order;
3. A National like network (present in the EF NLPLMN file), this list being also set in priority order;
4. A Roaming network (present in the EF PLMNwAcT, EF OPLMNwAcT), this list being also set in priority order.

Of course, as defined by the standard, the EHPLMN file and the PLMNwAcT and OPLMNwAcT files are facultative. In this case, steps 2 and 4 are facultative.

When the terminal is connected to a National like Network, after each interval of time defined in the HPNLPLMN file 22 or the HPPLMN file if the HPNLPLMN 22 is not present, the terminal launches a re-selection of a PLMN with the same priority as defined during the attachment process described above.

This ensures that when a terminal is connected to a National like network, it will try to reconnect to the Home network or to an Equivalent network (an equivalent network is a network with which the Home network has signed an agreement for not charging extra fees for the subscriber). In contrast, the state of the art only proposed to execute successively steps 1, 2 and 4 (step 3 is absent in the prior art).

In a first embodiment, a complete system is provided, comprising a secure element 20 cooperating with a telecommunication terminal. The secure element 20 or the terminal comprises files in which MCC/MNC codes of MNOs are stored. The telecommunication terminal being configured to select the files in order to try to attach the terminal to the telecommunication network of a MNO. The secure element 20 or the terminal also comprises a file, called National like network file, for storing national network codes (MCC/MNC) of networks of the country of the Home PLMN of the secure element 20. The terminal selects the National like network file in order to try to connect the terminal to one of the networks referenced in the National like network file. The terminal being configured to regularly check whether Home PLMN or a PLMN present in the EHPLMN file is available, if the EHPLMN file exists, in order to connect the terminal to the Home PLMN or to the PLMN of the EHPLMN file.

The terminal is preferably configured to not display a roaming logo on the screen of the terminal when the terminal is connected to one of the networks referenced in the National like network file. So, the user will not believe that he is connected to a foreign network. It is also possible to configure the terminal to display on its screen the name of the Home PLMN when the terminal is connected to one of the networks referenced in the National like network file. The terminal can also be configured to enable data service when it is connected to one of the networks referenced in the National like network file.

If the following different files exist in the secure element or in the terminal, the latter can be configured to select successively the following files in the secure element 20:
 the EHPLMN file;
 the National like network file;
 the file containing PLMNs of foreign countries.

In a second embodiment a secure element 20 is provided comprising files in which MCC/MNC codes of MNOs are stored. The secure element 20 cooperates with a telecommunication terminal. This secure element 20 also comprises a file, called National like network file, for storing national network codes (MCC/MNC) of networks of the Home PLMN of the secure element 20. The terminal being configured to select the National like network file in order to try to connect the terminal to one of the networks referenced in the National like network file. The terminal being configured to regularly check whether Home PLMN or a PLMN present in the EHPLMN file is available, if the EHPLMN file exists, in order to connect the terminal to the Home PLMN or to the PLMN of the EHPLMN file.

In a third embodiment, a telecommunication terminal is configured to cooperate with a secure element 20. The terminal or the secure element 20 comprises files in which MCC/MNC codes of MNOs are stored. The telecommunication terminal being configured to select the files in order to try to attach the terminal to the telecommunication network of a MNO. The secure element 20 or the terminal also comprises a file, called National like network file, for storing national network codes (MCC/MNC) of networks of the Home PLMN of the secure element 20. The terminal selects the National like network file in order to try to connect the telecommunication terminal to one of the networks referenced in the National like network file. The terminal being configured to regularly check whether Home PLMN or a PLMN present in the EHPLMN file is available, if the EHPLMN file exists, in order to connect the terminal to the Home PLMN or to the PLMN of the EHPLMN file.

The terminal according to the invention is preferably configured to not display a roaming logo on its screen when the terminal is connected to one of the networks referenced in the National like network file. The terminal is preferably configured to display on the screen of the terminal the name of the Home PLMN when the terminal is connected to one of the networks referenced in the National like network file. Advantageously, the terminal is configured to enable data service when the terminal is connected to one of the networks referenced in the National like network file. Preferably, the terminal is configured to select successively the following files if the files exist in the secure element 20 or in the terminal:

the EHPLMN file;
the National like network file;
the file containing PLMNs of foreign countries.

The terminal (or mobile equipment ME in general) is capable of:

Reading the USIM new EFs (i.e. EF_NLPLMN and EF_HPNLPLMN);
Using the new EF to perform National Like roaming process.

A method for National Like roaming process consists in the terminal of:

Attaching to a National Like PLMN without considering it is roaming (i.e. no roaming logo is displayed. It is not considered as international because it is part of home mobile network subscription plan)
Performing regularly checks if the home network (EF IMSI/EHPLMN) is available or a network having a higher priority is available.
If available then the handset re-selects automatically the home network or equivalent home network or the higher priority network.

When attached to a network part of the EF NLPLMN, a network is considered having a higher priority when it is the home network, a network part of equivalent network file, or national like network with higher priority (higher in the priority list) during the check above process, the ME checks if higher priority NLPLMN are available.

The new process of network selection contemplated by the inventive embodiments consists in the ME performing the following method:

At attachment, the handset checks—in the following priority order—the availability of a mobile network:
Home MNO (EF IMSI)
Equivalent MNO (EF EHPLMN)
National like roaming (new file: EF NLPLMN)
International roaming (EF OPLMN)
When attached to a network part of EF NLPLMN, it performs the National Like roaming process (see above).

The embodiment of the invention enable low cost national roaming with dedicated national like USIM file. The equivalent HPLMN list allows provisioning for multiple HPLMN codes, PLMN codes that are present within this list shall replace the HPLMN code derived from the IMSI for PLMN selection purposes. This list is stored on the USIM and is known as the EHPLMN list. The EHPLMN list may also contain the HPLMN code derived from the IMSI. If the HPLMN code derived from the IMSI is not present in the EHPLMN list then it shall be treated as a Visited PLMN for PLMN selection purposes.

As indicated in 3GPP TS 22.011 version 14.8.0 Release 14, it shall be possible for the home network operator to identify alternative Network IDs as the HPLMN. It shall be possible for the home network operator to store in the USIM an indication to the UE that a group of PLMNs are treated as the HPLMN regarding PLMN selection. Any PLMN to be declared as an equivalent to the HPLMN shall be present within the EHPLMN list and is called an EHPLMN. The EHPLMN list replaces the HPLMN derived from the IMSI. When the EHPLMN list is present, any PLMN in this list shall be treated as the HPLMN in all the network and cell selection procedures.

The invention claimed is:

1. A system comprising a secure element cooperating with a telecommunication terminal, said secure element or said terminal comprising:
   files in which Mobile Country Code/Mobile Network Code (MCC/MNC) codes of Mobile Network Operators (MNOs) are stored,
   said telecommunication terminal being configured to select said files in order to try to attach said terminal to a telecommunication network of a MNO, wherein said secure element or said terminal also comprises a file, called National like network file, storing national network codes of networks of a country of a Home PLMN of said secure element,
   said terminal selecting said National like network file in order to try to connect said terminal to one of the networks referenced in said National like network file,
   said terminal being configured to regularly check whether said Home Public Land Mobile Network (PLMN) or a PLMN present in an Equivalent PLMN (EHPLMN) file is available, if said EHPLMN file exists, in order to connect said terminal to said Home PLMN or to said PLMN of said EHPLMN file.

2. The system according to claim 1, wherein said terminal is configured to not display a roaming logo on a screen of said terminal when said terminal is connected to one of the networks referenced in said National like network file.

3. The system according to claim 2, wherein said terminal is configured to display on a screen of said terminal a name of said Home PLMN when said terminal is connected to one of the networks referenced in said National like network file.

4. The system according to claim 3, wherein said terminal is configured to enable data service when said terminal is connected to one of the networks referenced in said National like network file.

5. The system according to claim 1, wherein said terminal is configured to select successively from a group of files if said files exist in said secure element or in said terminal, where said group consists of
   said EHPLMN file;
   said National like network file; and
   a file containing PLMNs of foreign countries.

6. A secure element comprising,
   files in which Mobile Country Code/Mobile Network Code (MCC/MNC) codes of Mobile Network Operators (MNOs) are stored,
   said secure element cooperates with a telecommunication terminal, wherein said secure element also comprises a file, called National like network file, storing national network codes of networks of a country of a Home Public Land Mobile Network (PLMN) of said secure element,
   said terminal configured to select said National like network file in order to try to connect said terminal to one of the networks referenced in said National like network file,
   said terminal configured to regularly check whether said Home PLMN or a PLMN present in an Equivalent PLMN (EHPLMN) file is available, if said EHPLMN file exists, in order to connect said terminal to said Home PLMN or to said PLMN of said EHPLMN file.

7. A telecommunication terminal that cooperates with a secure element, said terminal or said secure element comprising:
   files in which Mobile Country Code/Mobile Network Code (MCC/MNC) codes of Mobile Network Operators (MNOs), are stored, said telecommunication terminal configured to select said files in order to try to attach said terminal to a telecommunication network of a MNO, wherein said secure element or said terminal also comprises a file, called National like network file, storing national network codes of networks of a country of a Home Public Land Mobile Network (PLMN) of said secure element, said terminal selecting said National like network file in order to try to connect said telecommunication terminal to one of the networks referenced in said National like network file, said terminal configured to regularly check whether said Home PLMN or a PLMN present in an Equivalent PLMN (EHPLMN) file is available, if said EHPLMN file exists, in order to connect said terminal to said Home PLMN or to said PLMN of said EHPLMN file.

8. The terminal according to claim 7, wherein said terminal is configured to not display a roaming logo on a screen of said terminal when said terminal is connected to one of the networks referenced in said National like network file.

9. The terminal according to claim 8, wherein said terminal is configured to display on the screen of said terminal the name of said Home PLMN when said terminal is connected to one of the networks referenced in said National like network file.

10. The terminal according to claim 9, wherein said terminal is configured to enable data service when said terminal is connected to one of the networks referenced in said National like network file.

11. The terminal according to claim 7, wherein said terminal is configured to select successively from a group of files if said files exist in said secure element or in said terminal, where said group consists of:

said EHPLMN file;

said National like network file; and a file containing PLMNs of foreign countries.

* * * * *